J. L. BONE & C. H. WOODS.
MEANS FOR COLLECTING FARES.
APPLICATION FILED JUNE 28, 1910.
979,419.
Patented Dec. 27, 1910.
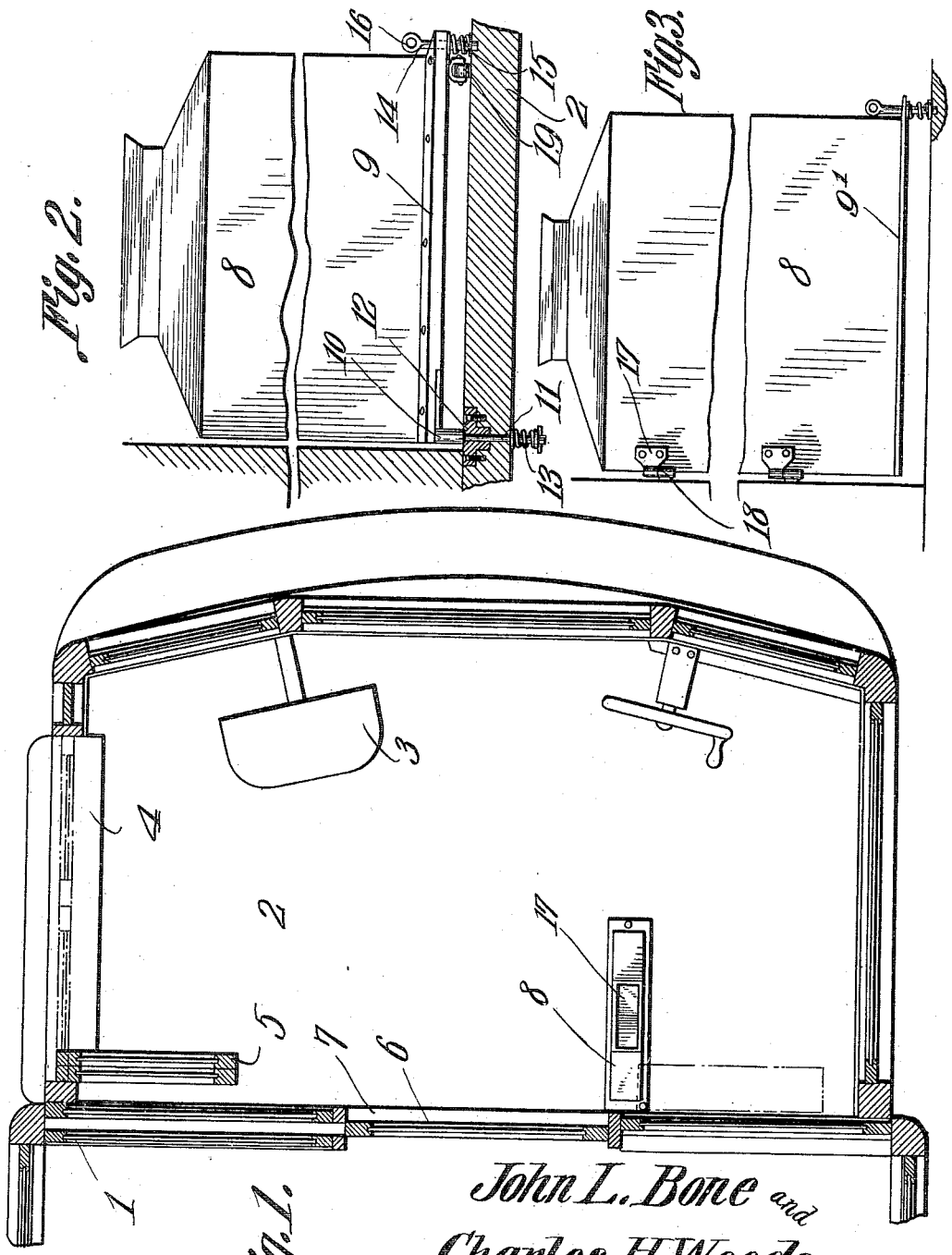
John L. Bone and
Charles H. Woods
Inventors,
by CASnow&Co.
Attorneys.
Witnesses

UNITED STATES PATENT OFFICE.

JOHN L. BONE AND CHARLES H. WOODS, OF DECATUR, ILLINOIS.

MEANS FOR COLLECTING FARES.

979,419. Specification of Letters Patent. Patented Dec. 27, 1910.

Application filed June 28, 1910. Serial No. 569,356.

*To all whom it may concern:*

Be it known that we, JOHN L. BONE and CHARLES H. WOODS, citizens of the United States, residing at Decatur, in the county of Macon, State of Illinois, have invented a new and useful Means for Collecting Fares, of which the following is a specification.

This invention has relation to means for collecting fares and is designed to provide a means whereby an ordinary passenger car of the street car type may be readily converted into a pay-as-you-enter car without the necessity of modifying the structure of the car in any particular.
Pay-as-you-enter cars as ordinarily constructed require a larger platform than is customary on cars of other types and consequently when an ordinary car is converted into a pay-as-you-enter car it is necessary to practically rebuild the car and particularly to enlarge the platforms. By the present invention this enlargement of the platforms is avoided while all the conveniences of the pay-as-you-enter car are retained, the passenger boarding the car at the rear platform and alighting from the car at the front platform. Furthermore the passenger deposits the exact fare in a suitable box thus eliminating the necessity of the conductor handling the money.

In accordance with the present invention there is provided a money receptacle at the side of the door where the passenger enters the body of the car and this box is so arranged that the conductor may stand therebehind out of the way of the passengers but still in position to aid the passengers as needed. When the car is running in the other direction the fare box may be moved to one side out of the way of the motor man, or in one form of the invention the box may be carried from one end of the car to the other while being so arranged that the passenger must move by the box on entering the body of the car.

The invention will be best understood from a consideration of the following detailed description taken in connection with the accompanying drawings forming a part of this specification, in which drawings, Figure 1 is a plan view of a car platform equipped with the present invention with some of the higher parts removed and their supports shown in section. Fig. 2 is a detail section showing one manner of supporting the fare box. Fig. 3 is an elevation showing the fare box supported in a different manner than shown in Fig. 2.

Referring to the drawings there is shown a car 1 which may be taken as indicative of an ordinary motor car of any suitable type provided at the ends with platforms in the usual manner, one platform 2 being shown in the drawings and on this platform there is shown a controller box 3, the showing being simply indicative.

Entrance is had to the platform 2 by way of a step 4 which may be taken as indicative of any form of entrance to the platform customary in motor cars. There is also shown a guard gate 5. There is also shown a door 6 for closing a passage way 7 leading from the platform 2 to the interior of the car.

At one side of the passage way 7, the side remote from that adjacent to the step 4, there is provided a fare box 8 of suitable height and length but of comparatively small thickness. In the structure shown in Fig. 2 the fare box 8 is mounted upon a plate 9 constituting a base for the fare box and this plate is formed at one end with a lug or projection 10 from which extends a stem 11. The lug or projection 10 rests upon a bearing block 12 set into the floor of the platform 2 adjacent to the body of the car and the stem 11 projects through the block 12 and beneath the platform is surrounded by a spring 13 tending to hold the lug 10 against the bearing plate 12. The outer end of the base 9 is traversed by a pin 14 surrounded below the plate 9 by a spring 15 tending to move the pin 14 toward the platform 2 and by provided sockets for the pin 14 the box 8 may be locked in either of two positions, the upper end of the pin 14 being provided with an eye 16 by means of which the pin may be readily manipulated. When the box 8 is in one position it extends perpendicular to the end of the car body in close relation to the opening 7 and when the box 8 is moved to the other position it is close to and parallel with the outer wall of the corresponding portion of the body 1 leaving the platform 2 practically clear so that the motor man is not interfered with and passengers may readily exit through the opening 7 and reach the step 4 in order to alight from the car.

When the box 8 is in the operative position, that is perpendicular to the body of the car, there is ample room for the conductor to stand behind the box, but the box at no time projects sufficiently onto the platform 2 to interfere with the movement of the conductor from behind the box when it is necessary to assist a passenger. At the same time the box is in convenient position to receive the fares which it is designed should be deposited in the box by the passenger and not by the conductor so that the conductor does not handle the money belonging to the company.

By providing suitable signs at the box and exterior to the car the passengers are instructed to enter the car at a certain end, to have their exact fares ready and to deposit the exact fare in the box 8 which latter of course is provided at the top with an opening 17 for the reception of the fares.

In the structure shown in Fig. 2 the box is practically a fixture, or the box may be removed from its support 9 and the latter is a fixture on the platform although capable of being moved out of the way against the body of the car.

In the structure shown in Fig. 3 the fare box 8 is provided with a bottom member or support 9' carrying the pin 14 as in the structure shown in Fig. 2, but instead of the plate 9' being made a fixture on the platform 2 it has no connection thereto except by the pin 14. The box 8 is supported by hinge members 17 fast to the corresponding end of the box and these members are adapted to hinge pintles 18 fast to the body of the car so that the box may be readily moved about the hinges 17—18 against the body of the car or to extended position as desired while at the same time the box may be readily carried from one end of the car to the other if it be desirable thereby obviating the necessity of having two fare boxes.

By locating the fare box on the side of the passageway 7 remote from the point of entrance of passengers to the platform 2 guard rails or other obstructive devices on the platform are obviated and the necessity of enlarging the platform, for the accommodation of such guard rails and like devices is avoided.

In the structure shown in Fig. 2 a roller 19 may be provided for the outer end of the support 9 while the spring 13 will yield to any unevenness of the platform 2 and the latch pin 14 will readily snap into the appropriate depression in the platform 2 formed to receive it. The springs 15 and 13, or the spring 13 alone will take up all looseness of fit and prevent rattling during the progress of the car.

When the platform 2 is the one used for the entrance of the passengers and the gate 5 is opened the fare box 8 is swung outward to the position shown in Fig. 1, the passengers entering, advancing toward the fare box and depositing their fare therein before entering the body of the car through the passageway 7. When the platform 2 is at the front of the car then the fare box 8 is either removed to the other end of the car or is swung out of the way against the front of the car body, and the motor man then controls the exit of the passengers by means of the gate 5.

What is claimed is:—

1. In a car structure, a fare box, and a pivot support therefor on the platform of the car, on which the fare box is movable to different positions about an axis substantially perpendicular to the platform.

2. In a car structure, a fare box and a support therefor at one side of the entrance to the body of the car, said fare box being movable into position substantially perpendicular to the end of the car body and also to a position substantially parallel with the end of the car body.

3. In a car structure, a fare box located on the side of the entrance to the body of the car remote from the passenger entrance to the platform of the car, said fare box being mounted for movement to a position perpendicular to the end of the car body or to a position substantially parallel therewith.

4. A means for converting a small-platform car into a pay-as-you-enter car, comprising a fare box rising to a suitable height above the platform, and connections between the fare box and car about which the fare box is movable into and out of position relative to the side of the entrance to the car body remote from the passenger entrance to the platform.

In testimony that we claim the foregoing as our own, we have hereto affixed our signatures in the presence of two witnesses.

JOHN L. BONE.
CHARLES H. WOODS.

Witnesses:
LILLIAN ASHMORE,
A. H. MILLS.